3,390,010
PROCESS FOR DYEING A FIBROUS MATERIAL WITH AN AQUEOUS PIGMENT DYE LIQUOR AND DYE LIQUOR

Gert Frerker, Frankenthal, Pfalz, and Peter Kutschera, Matthias Marx, and Wolfgang Schwindt, Ludwigshafen (Rhine), Germany, assignors to Badische Anilin- & Soda-Fabrik Aktiengesellschaft, Ludwigshafen (Rhine), Germany
No Drawing. Filed Dec. 7, 1964, Ser. No. 416,646
Claims priority, application Germany, Dec. 11, 1963, B 74,617; Mar. 10, 1964, B 75,833
4 Claims. (Cl. 117—161)

This invention relates to a process for dyeing fibrous material with pigment dyes and to dye liquors for the said process.

When dyeing fibrous materials with pigments and binders there is usually great difficulty in obtaining level dyeings. Since it is scarcely possible to make the drying process of the pad-dyed fibrous material so complete that the entire piece of material is dried uniformly, zones having different degrees of drying are always formed. One result of this is that dye liquor subsequently flows to the more strongly dried zones and the pigment is thus distributed unevenly over the fibrous material. Various measures have been proposed to prevent pigment migration but the desired result has not been achieved with them. One of these measures is the addition of small amounts of alginates. Another method for suppressing pigment migration is the use as binders of dispersions of copolymers which have been prepared by emulsion polymerization using special emulsifiers.

We have now found a new process by which pigment migration can be substantially lessened in the dyeing of fibrous materials with pigment dye liquors containing pigments and binders, and by which dyeings of great levelness are obtained.

In the process according to this invention the fibrous material is contacted with a dye liquor containing a pigment, a binder and polyvinylcaprolactam or a copolymer of vinylcaprolactam, with or without dyeing auxiliaries, and then dried.

Polymers of vinylcaprolactam which are soluble in the dye liquor are used for the new process, namely polyvinylcaprolactam, which is advantageously used in amounts of from 0.05 to 5% by weight, preferably 0.2 to 2% by weight, with reference to the pigment dye liquor, or a copolymer of vinylcaprolactam which is soluble in the dye liquid. The copolymers may be obtained by conventional methods by copolymerization of vinylcaprolactam with other monomers, for example vinylimidazole, vinylpyrrolidone, methacrylamide, acrylic acid, ethyl acrylate and vinyl acetate. When water-insoluble monomers are used for the production of the copolymers, the relative proportions and/or the combination should be chosen so that the copolymer is soluble in the dye liquor at the dyeing temperature. It is preferred to use copolymers of the said type in the preparation of which more than 30% by weight of vinylcaprolactam has been used with reference to the total weight of monomers. Copolymers are also advantageously used in amounts of from 0.05 to 5% by weight, preferably 0.2 to 2% by weight, with reference to the pigment dye liquor.

The pigment dye liquors may contain as the pigments all the inorganic and organic pigments conventionally used for the pigment dyeing industry. They also contain a binder and polyvinylcaprolactam or a copolymer of vinylcaprolactam of the type specified above. They may also contain conventional additives, such as diluents or substances which improve for example the quality of the dyeing, such as plasticizers, emulsifiers, thickeners, protective colloids, fillers and other auxiliaries. Catalysts may also be added according to the type of binder used, for example acids or acid donors, such as ammonium nitrate or diammonium phosphate in the case of binders which are to be fixed under acid conditions, or caustic alkali solutions or alkali donors, such as potassium bicarbonate or sodium bicarbonate, in the case of binders which are to be fixed under alkaline conditions.

The pigment dye liquors may contain as binders all crosslinkable copolymers or curable precondensates conventionally used for the pigment dyeing of textiles and which are compatible with the polyvinylcaprolactam or the copolymers of vinylcaprolactam. Examples of these binders are crosslinkable copolymers in aqueous dispersion which are composed of hardening components, such as vinyl chloride, methyl methacrylate, acrylonitrile or styrene, and softening components, such as the acrylic esters of higher alcohols or butadiene, and which contain groups which are crosslinkable either alone or mixed with curable precondensates and/or other at least bifunctional compounds. Examples of monomers having groups which are self-crosslinkable are: methylolamides of unsaturated acids and their alkyl ethers. Examples of curable precondensates are the reaction products of aldehydes, particularly formaldehyde, with urea, melamine, urethanes, monoureines, diureines, ethylenurea, and etherification products of the methylol compounds obtainable. If these curable precondensates are to exert a crosslinking action on the polymers which are coemployed, these should contain carboxylic groups or carboxylic amide groups or other groups capable of reacting with the precondensates. Examples of other crosslinking compounds are polybasic amines for copolymers containing epoxy groups, or compounds containing a plurality of ethylenimine groups which are capable of reacting with carboxylic groups of copolymers.

The new process may be carried out for example by adding polyvinylcaprolactam or a copolymer of vinylcaprolactam of the abovementioned type to a pigment dye liquor obtainable in a conventional way from pigment dyes, binders, water and other additives, and then padding fibrous material, for example textile fabric, with this liquor. The padded material is then dried and if necessary aftertreated at higher temperature for the purpose of fixation. Temperatures of from 50° to 100° C. are generally used for the drying and temperatures of from 100° to 200° C. for the fixing aftertreatment. The duration of the fixing aftertreatment depends on the height of the temperature and may be from several minutes to a few seconds. The upper temperature limit is determined by the sensitivity of the fibrous material used to temperature. The drying may be carried out in dryers conventionally used in practise, such as drying chambers, tenter dryers, festoon dryers or cylinder drying machines.

Suitable fibrous materials for the new process are woven and knitted fabrics of natural and man-made fibers, which may consist for example of cotton, rayon staple, wool, silk, cellulose acetate, viscose, polyamide, polyester, polyacrylonitrile, asbestos and glass.

Dyeings obtainable according to the new process are distinguished by great levelness.

The invention is further illustrated by the following examples in which the parts and percentages given are by weight.

Example 1

A dye liquor is prepared from:
50 parts of an about 45% aqueous dispersion of a copolymer of
  60% of butyl acrylate,
  20% of vinyl chloride,
  15% of methyl acrylate and
  5% of methacrylamide, 3 parts of an about 70% aqueous solution of a urea-formaldehyde precondensate which has been partly etherified with methanol,
7 parts of an about 35% aqueous paste of copper phthalocyanine containing an emulsifier,
5 parts of diammonium phosphate,
5 parts of polyvinylcaprolactam and
930 parts of water 1000 parts.

A cotton cloth is padded with this liquor. The padded cloth is dried at 80° C. on a pin stenter frame. A very level deeply color dyeing is obtained which exhibits only extremely small pigment migration at the edges and at the points of penetration of the pins. The dried cloth is fixed for four minutes at 150° C. A dyeing having good general fastness is obtained.

Example 2

A dye liquor is prepared from:

65 parts of an about 40% aqueous dispersion of a copolymer of
    80% of butyl acrylate,
    16% of methyl methacrylate and
    4% of N-methylolmethacrylamide,
6 parts of an about 35% aqueous paste of the dye C.I. Vat Orange (Colour Index (1956) No. 71105) containing an emulsifier,
4 parts of ammonium nitrate,
8 parts of an about 40% aqueous solution of polyvinylcaprolactam and
917 parts of water 1000 parts.

A union cloth of 70% of polyester and 30% of rayon staple is padded with this liquor. The padded cloth is dried at 80° C. in a cylinder drying machine. The dried cloth is fixed for three minutes at 160° C. A very level dyeing is obtained having good general fastness.

Example 3

A dye liquor is prepared from:

60 parts of an about 45% aqueous dispersion of a copolymer of
    60% of ethylhexyl acrylate,
    30% of acrylonitrile and
    10% of 2-hydroxy-3-chloropropyl acrylate,
5 parts of an about 40% aqueous paste of an azo dye obtainable from 2,4,5-trichloroaniline and 2,3-oxynaphthoic-o-toluidide and containing an emulsifier,
5 parts of potassium bicarbonate,
10 parts of an about 40% aqueous solution of polyvinylcaprolactam and
920 parts of water 1000 parts.

A cloth of polyester staple fiber is padded with this liquor. The padded cloth is dried at 70° C. on a clip stenter frame. The dried cloth is fixed for one minute at 180° C. A level dyeing having good general fastness is obtained.

Example 4

A dye liquor is prepared from:

50 parts of an about 45% aqueous dispersion of a copolymer of
    60% of butyl acrylate,
    20% of vinyl chloride,
    15% of methyl acrylate and
    5% of methacrylamide,
3 parts of an about 70% aqueous solution of a urea-formaldehyde precondensate which has been partly etherified with methanol,
7 parts of an about 35% aqueous paste of copper phthalocyanine containing an emulsifier,
5 parts of diammonium phosphate,
5 parts of a copolymer of 60% of vinylcaprolactam and 40% of vinylimidazole, and
930 parts of water 1000 parts.

A cotton cloth is padded with this liquor. The padded cloth is dried at 80° C. on a pin stenter frame. A very level deep colored dyeing is obtained which exhibits only extremely little pigment migration at the edges and at the points of penetration of the pins. The dried cloth is fixed for four minutes at 150° C. A dyeing having good general fastness is obtained.

Example 5

A dye liquor is prepared from:

65 parts of an about 40% aqueous dispersion of a copolymer of
    80% of butyl acrylate,
    16% of methyl methacrylate and
    4% of N-methylolmethacrylamide,
6 parts of an about 35% aqueous paste of the dye C.I. Vat Orange (Colour Index (1956) No. 71105), which contains an emulsifier,
4 parts of ammonium nitrate,
16 parts of an about 20% aqueous solution of a copolymer of
    35% of vinylcaprolactam,
    35% of vinylpyrrolidone and
    30% of vinylimidazole and
909 parts of water 1000 parts.

A union cloth of 70% of polyester and 30% of rayon staple is padded with this liquor. The padded cloth is dried at 80° C. in a cylinder dryer. The dried cloth is fixed for three minutes at 160° C. A very level dyeing having good general fastness is obtained.

Example 6

A dye liquor is prepared from:

60 parts of an about 45% aqueous dispersion of a copolymer of
    60% of ethylhexyl acrylate,
    30% of acrylonitrile and
    10% of 2-hydroxy-3-chloropropyl acrylate,
5 parts of an about 40% aqueous paste of an azo dye obtainable from 2,4,5-trichloroaniline and 2,3-oxynaphthoic-o-toluidide and containing an emulsifier,
5 parts of potassium bicarbonate,
20 parts of an about 20% aqueous solution of a copolymer of
    50% of vinylcaprolactam and
    50% of methacrylamide and
910 parts of water 1000 parts.

A polyester staple fiber cloth is padded with this liquor. The padded cloth is dried at 70° C. on a clip stenter frame. The dried cloth is fixed for one minute at 180° C. A level dyeing having good general fastness is obtained.

We claim:

1. A process for dyeing fibrous material which comprises contacting said material with an aqueous dye liquor containing:
    (a) a pigment,
    (b) a cross-linkable resin binder and
    (c) from 0.05 to 5.0% by weight based on the weight of said liquor of a polymer selected from the group consisting of polyvinylcaprolactam and copolymers of vinylcaprolactam which are soluble in said dye liquor,
and drying said material by heating the treated material to a temperature of from 50° to 200° C.

2. A process as claimed in claim 1 wherein the dye liquor also contains at least one dyeing auxiliary.

3. An aqueous dye liquor for dyeing fibrous material which comprises:
 (a) pigment,
 (b) a cross-linkable resin binder and
 (c) 0.05 to 5.0% by weight based on the weight of said liquor of a polymer selected from the group consisting of (1) polyvinylcaprolactam and (2) copolymers of vinylcaprolactam and another monomer selected from the group consisting of vinylimidazole, vinylpyrrolidone, methacrylamide, acrylic acid, ethyl acrylate and vinyl acetate, the polymer and copolymer being soluble in the dye liquor.

4. An aqueous dye liquor as claimed in claim 3 wherein the amount of component (c) is from 0.2 to 2.0% by weight.

References Cited

UNITED STATES PATENTS

| | | | |
|---|---|---|---|
| 2,719,831 | 10/1955 | Craemer et al. | 260—88.3 |
| 2,759,910 | 8/1956 | Miline et al. | 260—88.3 |
| 2,776,947 | 1/1957 | Schildknecht | 260—88.3 |
| 2,808,383 | 10/1957 | Fikentscher et al. | 117—161 |
| 2,901,457 | 8/1959 | Stoner et al. | 260—895 |
| 2,949,386 | 8/1960 | Cassel | 117—161 |
| 2,982,762 | 5/1961 | Voeks et al. | 260—88.3 |
| 2,989,360 | 6/1961 | Mautner | 260—895 |
| 3,027,347 | 5/1962 | Fikentscher et al. | 260—895 |
| 3,061,569 | 10/1962 | Stoner et al. | 260—895 |

FOREIGN PATENTS 1,135,418  8/1962  Germany.

WILLIAM D. MARTIN, *Primary Examiner.*

T. G. DAVIS, *Assistant Examiner.*